US007709735B2

(12) United States Patent
Vigorito et al.

(10) Patent No.: US 7,709,735 B2
(45) Date of Patent: May 4, 2010

(54) LIFT COVER AND GASKET ASSEMBLY

(75) Inventors: Thomas J. Vigorito, Black Rock, CT (US); Thomas W. Bracci, Trumbull, CT (US)

(73) Assignee: Hubbell Incorporated, Orange, CT (US)

( * ) Notice: Subject to any disclaimer, the term of this patent is extended or adjusted under 35 U.S.C. 154(b) by 1 day.

(21) Appl. No.: 12/081,237

(22) Filed: Apr. 11, 2008

(65) Prior Publication Data
US 2009/0255703 A1 Oct. 15, 2009

(51) Int. Cl.
*H02G 3/14* (2006.01)

(52) U.S. Cl. ............................ 174/67; 174/66; 174/53; 220/241; 220/242; 439/536; D13/156

(58) Field of Classification Search .................. 174/66, 174/67, 480, 481, 50, 53, 57, 58, 135, 152 G, 174/153 G, 152 R; 220/3.2–3.9, 4.02, 241, 220/242; 248/906; 439/535, 536, 142, 144, 439/146, 147, 892, 894; 16/2.1, 2.2; D13/156, D13/154, 184
See application file for complete search history.

(56) References Cited

U.S. PATENT DOCUMENTS

| 1,455,399 | A | 5/1923 | Keavaney |
| 3,098,114 | A * | 7/1963 | Hawn et al. ................... 174/66 |
| 3,288,910 | A | 11/1966 | Zerwes |
| 3,392,228 | A | 7/1968 | Zerwes |
| 4,138,187 | A | 2/1979 | Brygger |
| 4,343,411 | A * | 8/1982 | Chesnut et al. ............. 220/242 |
| 4,349,236 | A | 9/1982 | Guelden |
| 4,484,021 | A | 11/1984 | Schaefer |
| 5,571,023 | A | 11/1996 | Anthony |
| 5,588,853 | A | 12/1996 | Anthony |
| 6,179,634 | B1 | 1/2001 | Hull |
| 6,554,626 | B2 | 4/2003 | Ramos, Jr. |
| 6,858,802 | B2 | 2/2005 | Hagarty |
| 7,087,838 | B2 * | 8/2006 | Ferderer et al. ......... 174/153 G |
| D534,130 | S | 12/2006 | Park |
| D534,499 | S | 1/2007 | Park |
| 7,192,302 | B2 | 3/2007 | Phung |
| 7,227,079 | B2 * | 6/2007 | Noest et al. ................... 174/50 |
| D581,368 | S | 11/2008 | Cummings et al. |
| 2006/0037773 | A1 | 2/2006 | Castaldo |

* cited by examiner

*Primary Examiner*—Angel R Estrada
(74) *Attorney, Agent, or Firm*—Garrett V. Davis; Mark S. Bicks; Alfred N. Goodman

(57) ABSTRACT

An electrical box assembly includes a cover assembly, a gasket and an electrical box coupled together by mounting screws. The cover includes a base with a plurality of screw holes for receiving the mounting screws. A support member having an axial passage extends from the bottom face of the cover around each of the screw holes. The gasket includes a cylindrical shaped sleeve that passes through the support member and has an axial length to extend from the screw hole in the cover. The mounting screws are inserted through the axial passage of the sleeve and the screw holes in the cover to axially compress the sleeve to form a watertight seal between the screw shaft and the support member.

23 Claims, 4 Drawing Sheets

LIFT COVER AND GASKET ASSEMBLY

FIELD OF THE INVENTION

The present invention is directed to a weatherproof electrical enclosure and to a weatherproof electrical box assembly. More particularly, the invention is directed to a weatherproof cover and gasket assembly for a wiring device.

BACKGROUND OF THE INVENTION

Various outdoor weatherproof electrical boxes and covers for electrical wiring devices are known in the art. The weatherproof covers generally have a cover that is closed by gravity or by a spring mechanism to close the cover and protect the wiring device from the weather. The covers are constructed to prevent dirt and water from entering the electrical box and the electrical device when the cover is closed.

Numerous electrical connector housings with hinged lids are known in the art. One example is disclosed in U.S. Pat. No. 5,571,023 to Anthony. This patent discloses an electrical connector lid having a weather tight seal. The weather tight seal is formed in the lid and seals against a flange formed on the face of the connector housing.

Another weatherproof electrical closure is disclosed in U.S. Patent Publication No. 2006/0037773 to Castaldo et al. The weatherproof junction box includes a recessed port with a knockout plug located at an end of the recessed port for connecting an electrical conduit. The enclosure includes a hinged cover connected to a stationary portion by a hinge. A rubber gasket is positioned between the cover and the electrical box to form a weatherproof seal between the box and the cover. The gasket has a raised portion that extends through an opening in the stationary portion to form the seal with the cover.

U.S. Pat. No. 7,192,302 to Phung et al. discloses an integrated sealable plate assembly. The assembly includes an outer plate with an opening for a cable connector and screw hole for receiving a screw. The screw hole has a flared inner surface which mates with a gasket member. The gasket has a depending portion with an annular recess that receives the flared portion of the plate.

While numerous devices have been made to provide a cover for an opening of electrical connectors, the prior devices have various disadvantages. Many of these prior devices require many parts and are expensive to manufacture. In addition, many of the prior devices do not provide adequate sealing to prevent water and/or dirt from entering the cover.

Accordingly, there is a continuing need in the industry for an improved cover assembly for an electrical box.

SUMMARY OF THE INVENTION

The present invention is directed to an electrical box assembly having a cover, a gasket and an electrical box. The invention is particularly directed to an electrical box assembly for providing a watertight seal to protect the electrical device mounted within the electrical box from water and debris.

Accordingly, one aspect of the invention is to provide an electrical connector housing, such as an electrical box, and having a cover member on the housing that provides a watertight seal between the housing and the cover.

Another aspect of the invention is to provide an electrical connector housing having a gasket that forms a watertight seal between the base of the cover and the electrical box. The gasket has a dimension to form a watertight seal between the perimeter of the cover and the electrical box. The gasket also forms a watertight seal between the mounting screws and the cover when the cover is attached to the electrical box and between a hinged closure member on the cover and the base of the cover.

A further aspect of the invention is to provide a gasket having a collar extending from the plane of the gasket and forming a watertight seal between the base of the cover and the electrical box. The base of the cover has a gasket support member with an axial passage extending from the bottom side and aligned with the screw holes. In one embodiment the support member has a cylindrical shape extending from the base. The gasket includes a sleeve with an axial passage that is inserted into the axial passage of the support members. The mounting screws are passed through the axial passage of the sleeve and support member to axially compress the sleeve, thereby radially deforming a portion of the sleeve and forming a seal between the screw shaft and the support member of the base.

The foregoing aspects of the invention are basically attained by providing a cover for an electrical device comprising a base having an opening with a dimension corresponding to the electrical device, a front surface and a rear surface. A screw hole extends between the front surface and the rear surface, and a support member extends from the rear surface. A gasket with a body portion corresponds to a dimension of the base for forming a seal between the base and an electrical box. The gasket has a front surface, a rear surface, and a sleeve extending from the front face and is positioned to align with the screw hole and the support member of the base. The sleeve has a length to extend through the base. The sleeve is axially compressible by a screw extending through the screw hole.

The aspects of the invention are also attained by providing a cover for an electrical device which comprises a base having an opening with a dimension corresponding to a dimension of the electrical device, a front surface, and a rear surface. At least one screw hole extends between the front surface and the rear surface, and a support member having an axial passage extends from the rear surface and is aligned with the screw hole. A screw has a head and a threaded shaft that extends through the screw hole and support member in the base for coupling the base to an electrical box. A gasket has a bottom portion corresponding to a dimension of the base for forming a seal between the base and an electrical box. The gasket has a front surface and a rear surface and a sleeve extending from the front surface and aligned with the screw hole and positioned within the cylindrical support member of the base. The sleeve has an axial length extending through the screw hole a distance to contact the screw head. Tightening the screw with respect to the electrical box axially compresses the sleeve to form a seal against the screw head and to deflect a portion of the sleeve radially outwardly to form a seal between the screw shaft and the support member.

The various aspects of the invention are also attained by providing a method of forming a weatherproof seal between an electrical box and a cover. The method comprises positioning a cover and gasket onto an electrical box. The cover includes a base having an opening with a dimension corresponding to a dimension of an electrical device mounted to the electrical box, a front surface and a rear surface. At least one screw hole extends between the front and rear surface, and a support member has an axial passage and extends from the rear surface and is aligned with the screw hole. The gasket has a bottom portion corresponding to a dimension of the base and an electrical box, a front surface and a rear surface. A sleeve extends from the front surface through the axial passage of the sleeve and through the screw hole. A screw is inserted through the screw hole and sleeve and threads into the electrical box. The screw is tightened to axially compress the sleeve into the screw hole, thereby radially expanding the sleeve to form a seal with the support member and the screw.

Other aspects, advantages and salient features of the invention will become apparent to those skilled in the art from the following detailed description, which taken in conjunction with the annexed drawings, discloses various embodiments of the present invention.

BRIEF DESCRIPTION OF THE DRAWINGS

Referring to the drawings which form a part of this original disclosure, in which.

DETAILED DESCRIPTION OF THE INVENTION

Figure 1:
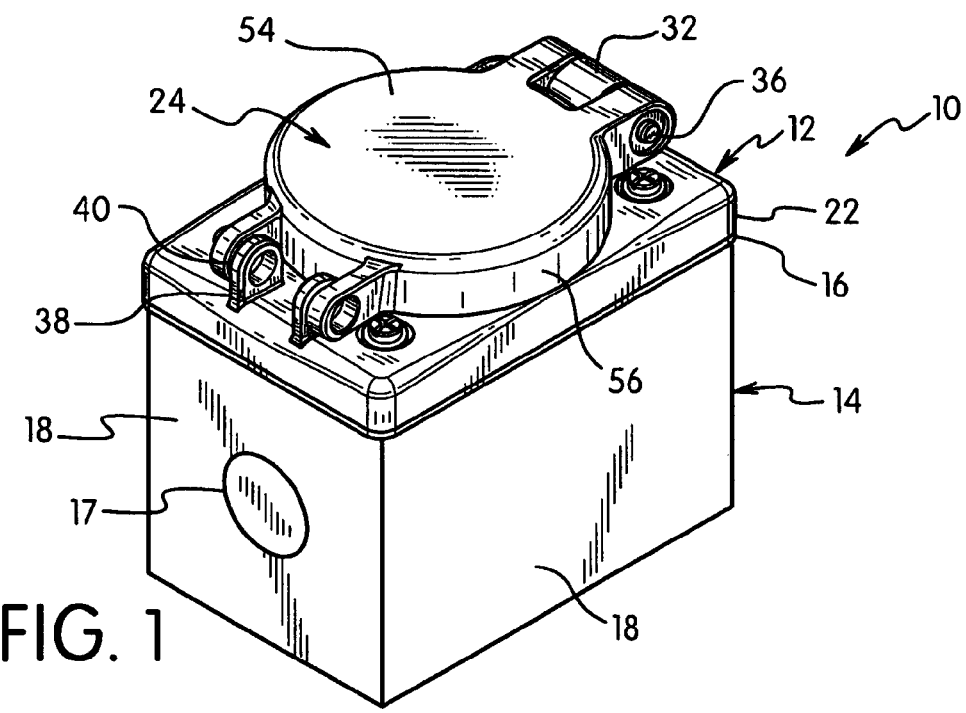
FIG. 1 is a perspective view of the electrical box assembly in one embodiment of the invention.
Figure 2:
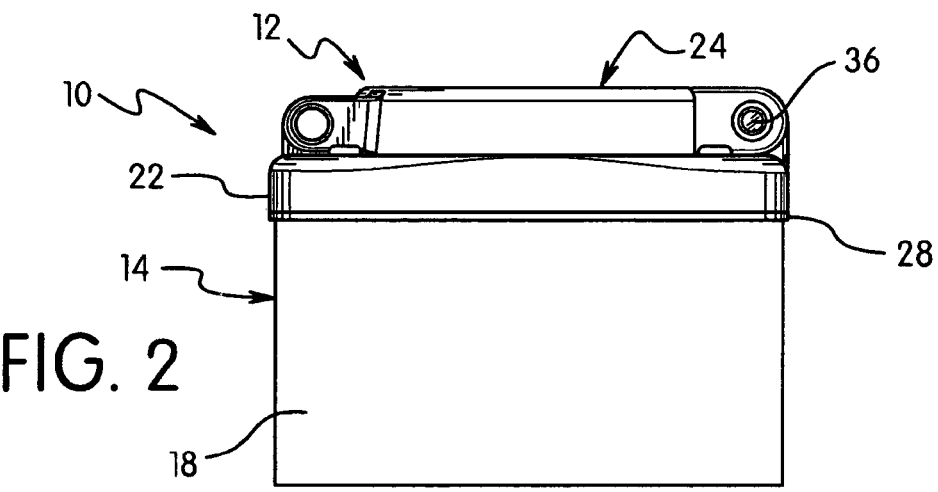
FIG. 2 is a side view of the electrical box assembly of FIG. 1.
Figure 3:
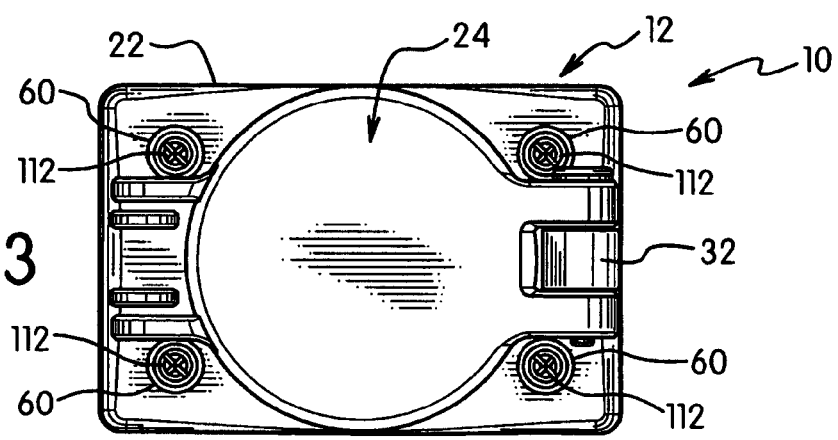
FIG. 3 is a top view of the electrical box assembly of FIG. 1.

The present invention is directed to a waterproof electrical box assembly. In particular, the invention is directed to an electrical box assembly that includes a waterproof seal to protect the electrical components from water and debris.

Referring to the drawings, the electrical box assembly 10 of the invention includes a cover 12, electrical box 14 and a gasket 16.

Electrical box 14 is a standard enclosure for supporting electrical wiring and an electrical device such as a switch or electrical receptacle. In the embodiment illustrated, electrical box 14 is a weatherproof electrical box designed for outdoor use or for use in wet environments. One or more knockouts 17 can be provided in the side walls 18 to feed electrical wiring to the electrical device. For simplicity, the electrical device is not shown in the drawings. Electrical box 14 includes a plurality of threaded screw holes 20 for coupling cover 12 to electrical box 14 as shown in FIG. 5.

Figure 4:
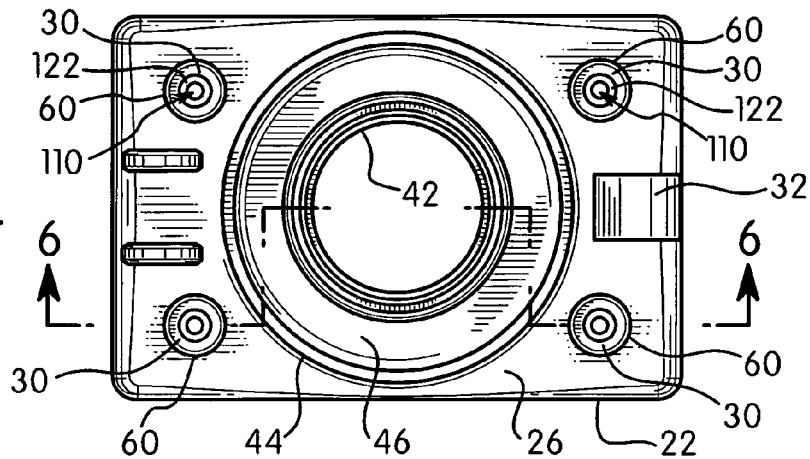
FIG. 4 is a top plan view of the base of the cover without the closure member in one embodiment of the invention.
Figure 7:
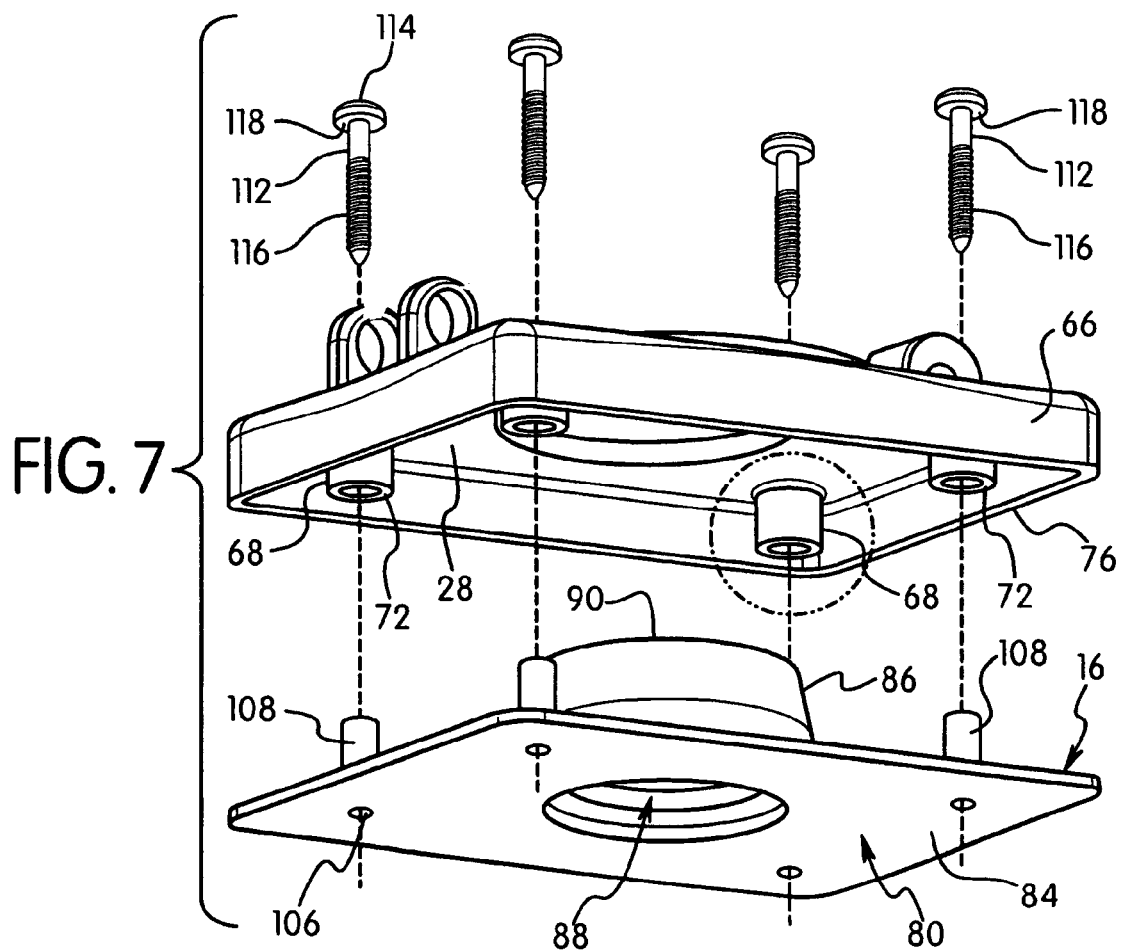
FIG. 7 is a perspective bottom view showing the gasket and base of the cover.

Cover 12 includes a base 22 and a closure member 24 forming a lid. Base 22 includes a front surface 26 and a rear surface 28 and a plurality of screw holes 30 extending between the front surface 26 as shown in FIG. 4 and rear surface 28 as shown in FIG. 7.

Figure 5:
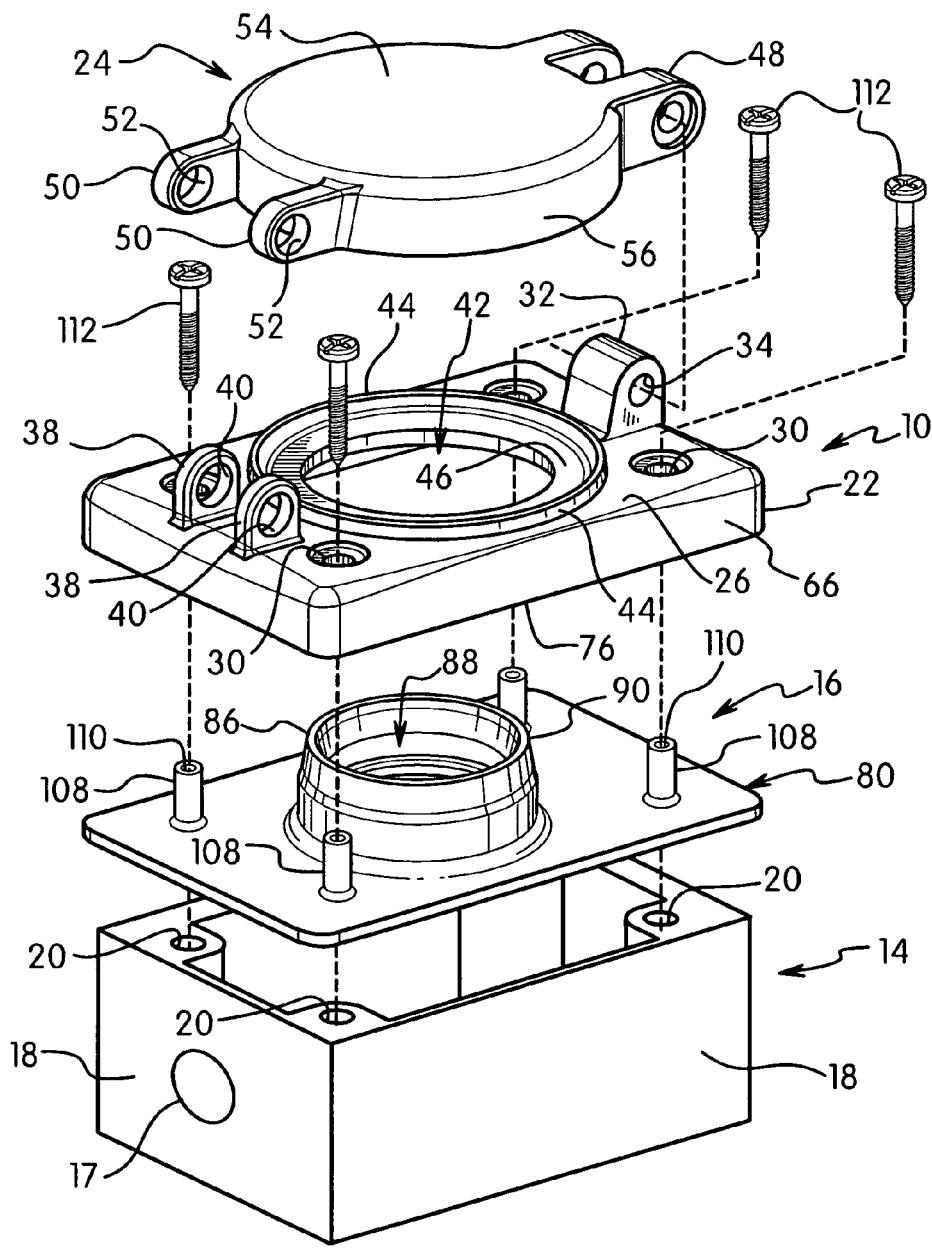
FIG. 5 is an exploded perspective view of the electrical box assembly of FIG. 1.

Referring to FIGS. 1 and 5, base 22 includes a hinge member 32 having a hinge hole 34 for receiving hinge pin 36. In the embodiment illustrated, hinge member 32 is positioned at one end of base 22. The opposite end of base 22 is provided with a pair of locking members 38 having a hole 40 for receiving the shank of a pad lock (not shown). Cover 12 is preferably made from a rigid material such as metal or a rigid plastic material.

Base 22 in the embodiment illustrated has a generally rectangular shape and has a shape and dimension corresponding to the open top end of electrical box 14. Base 22 includes a central opening 42 for accessing the electrical device mounted in electrical box 14 and for receiving gasket 16. Opening 42 has a shape corresponding to the shape and dimension of the electrical device. In the embodiment shown in FIG. 5, opening 42 has a circular shape centrally located on the front surface 26 of base 22. In this embodiment, the electrical device can be, for example, an electrical receptacle. An annular rib 44 encircles opening 42 and is spaced from opening 42 to define a ledge 46. Annular rib 44 extends in a direction substantially perpendicular to the plane of front surface 26 of base 22.

Closure member 24 defines a lid for closing the opening 42 in base 22 and covering the electrical device mounted in the electrical box 14. Closure member 24 includes a pair of hinge members 48 for mating with hinge member 32 of base 22. Hinge member 48 is coupled to hinge member 32 by hinge pin 36 to pivotally connect closure member 24 to base 22. Closure member 24 also includes a pair of locking members 50 having a hole 52 for aligning with the hole 40 of locking members 38 of base 22. The shank of a padlock (not shown) can be passed through the holes in the locking members to prevent unauthorized access to the electrical device.

Closure member 24 has a shape and dimension complementing the shape and dimension of opening 42 and annular rib 44 of base 22. In one embodiment, cover member 24 includes a top wall 54 and a side wall 56. Side wall 56 in the embodiment illustrated has a shape complementing the shape and dimension of annular rib 44. Side wall 56 preferably mates with rib 44 to prevent or inhibit debris and water from entering closure member 24. Closure member 24 can be spring biased to a closed position. Closure member 24 preferably includes an annular inner wall 58 shown in FIG. 6 for mating with gasket 16. Inner wall 58 is concentric with side wall 56 and has a dimension to mate with the opening 42 in base 22 and gasket 16 and to cover the electrical device in the electrical box 14.

Figure 6:
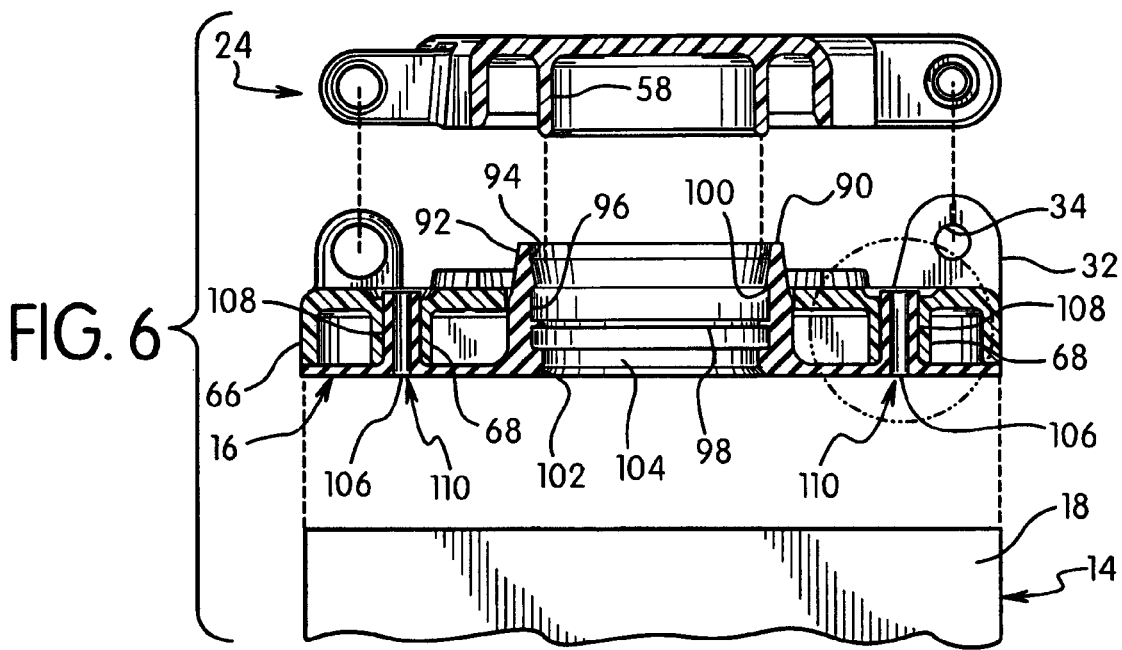
FIG. 6 is an exploded cross-sectional view taken along line 6-6 of FIG. 4.
Figure 9:
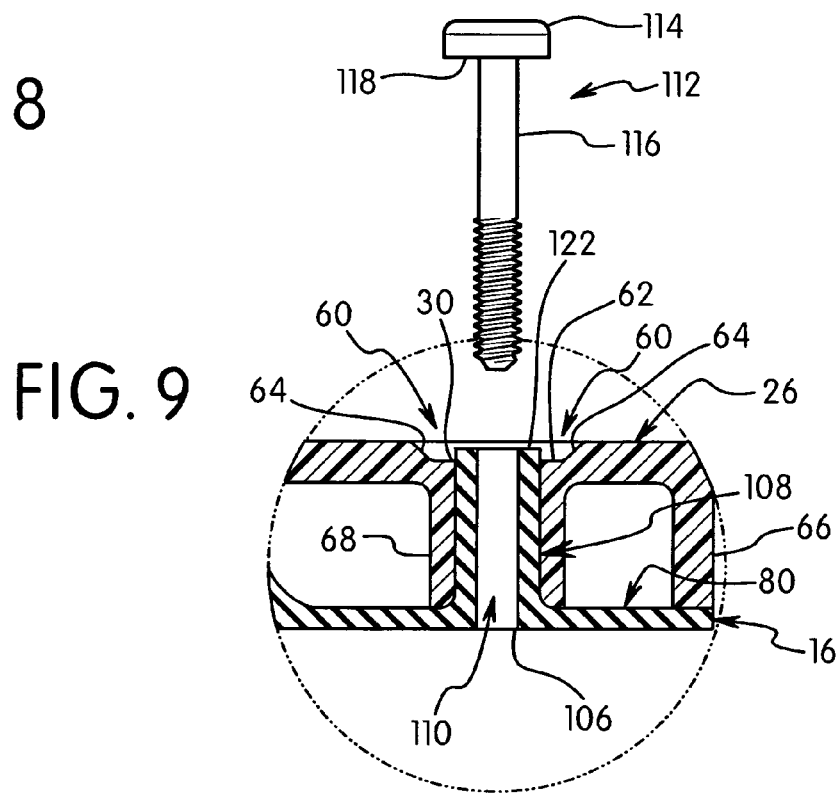
FIG. 9 is an enlarged partial view showing the gasket assembled to the base with the gasket sleeve extending through the support member.

Screw holes 30 in base 22 in one embodiment of the invention are recessed with respect to front surface 26 as shown in FIGS. 6 and 9. Recess 60 surrounds the screw hole 30 and includes a bottom portion 62 and a side portion 64. Bottom portion 62 has a substantially flat planar surface perpendicular to the axis of screw hole 30 and parallel to front surface 26. Side portion 64 has a generally curved shape extending from flat bottom portion 62 to front surface 26.

Figure 8:
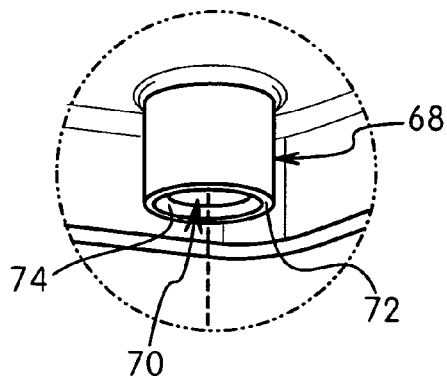
FIG. 8 is an enlarged partial perspective view of the support member extending from the base of the cover.

As shown in FIG. 7, base 22 has a flange 66 extending from the perimeter of base 22 and perpendicular to the plane of front surface 26. Preferably, flange 66 is continuous and integrally formed with base 22. As shown in FIGS. 7 and 8, a plurality of support members 68 extends from the rear surface 28 of base 22. The support members 68 have an axial passage 70 aligned with a respective screw hole 30 so that the support members 68 surround the respective screw hole 30. In the embodiment illustrated, the support members 68 are cylindrical shaped members integrally formed with base 22 and have an axial end 72. Preferably, support member 68 has a chamfered inner edge 74 at the axial end 72. Axial end 72 typically has a flat surface perpendicular to the axis of the axial passage 70. In the embodiment shown, support member 68 defines a continuous cylindrical annular member. In alternative embodiments, support member 68 can have one or more longitudinal slots, can be formed from a plurality of members arranged to encircle the screw hole, or have a non-circular configuration such as a square, rectangle or other shape that is capable of supporting the cover and forming a seal with the gasket as discussed hereinafter. Support member 68 has an axial length substantially equal to an axial length of flange 66. Preferably, flange 66 has a bottom edge 76 lying in the same plane as axial end 72 of support member 68.

A gasket 16 is positioned between base 22 and electrical box 14 to form a watertight seal to prevent water and debris from entering the electrical box 14 and from entering between cover 12 and gasket 16. Gasket 16 has a planar base portion 80 having a dimension complementing the top end of electrical box 14 and complementing the dimension of flange 66 of base 22. Base portion 80 has a substantially planar top surface and a planar bottom surface with a thickness sufficient to form a watertight seal. Preferably, gasket 16 is made from an elastomeric material that is sufficiently flexible to form a watertight seal.

Gasket 16 has an annular collar 86 defining an axial passage 88. As shown in FIG. 6, collar 86 has a generally cylindrical shape with an axial length to extend through opening 42 in base 22. Preferably, collar 86 forms a waterproof seal between collar 86 and the inner edge of opening 42. Water that does enter through opening 42 is prevented from entering electrical box 14 by the bottom portion 80 of gasket 16. Collar 86 has an axial end 90 with a chamfered outer surface 92 and a chamfered inner surface 94. Collar 86 includes an annular recess having an annular rib 98 and forming a lip 100 with the inner chamfered edge 94. Collar 86 is formed with a chamfered bottom edge 102 adjacent bottom surface 84. An annular inner surface 104 is formed between recess 96 and chamfered bottom edge 102 for forming a seal with the electrical device. In the embodiment shown in the drawings, collar 86 is a cylindrical annular shaped member to accommodate the opening in base 22 and the electrical device. In other embodiments, collar 86 can have a shape corresponding to the shape of the opening in base 22 to form a watertight seal.

Base portion 80 of gasket 16 includes a plurality of screw holes 106 aligned with the screw holes in base 22. A cylindrical shaped sleeve 108 having an axial passage 110 extends from top surface 82 encircling the screw holes 86. Sleeve 108 is integrally formed with gasket 16 and is sufficiently flexible to form a watertight seal between sleeve 108 and base 22. In the embodiment shown sleeve 108 has a substantially cylindrical shape to complement the shape of the corresponding support member 68. Preferably, sleeve 108 has an outer shape and dimension corresponding to the shape and dimension of the axial passage of sleeve 68. Sleeve 108 has an outer dimension to fit within the axial passage 70 of the respective support member 68 and an inner dimension to receive a mounting screw. As shown in FIG. 6, sleeve 108 has an axial length slightly greater than the axial length of support member 68 and a length to extend into the recess 60. In the embodiment shown in FIG. 9, sleeve 108 has an axial length to extend above flat bottom portion 62 of recess 60 and below the front surface 26 of base 22 such that the axial end of sleeve 108 is positioned within the recess 60.

Figure 10:
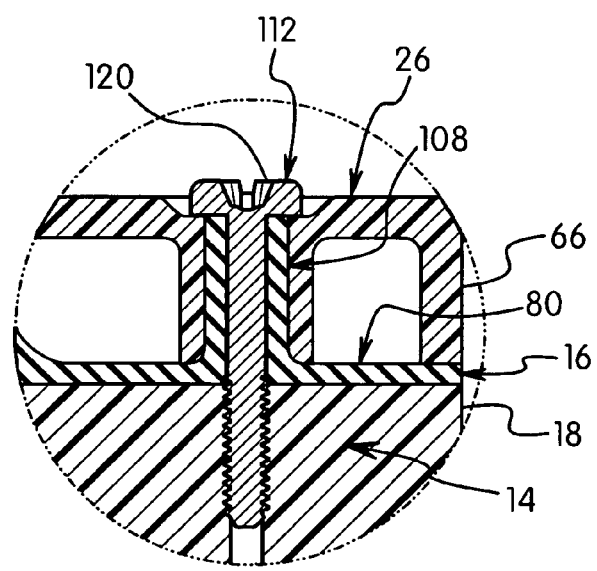
FIG. 10 is an enlarged partial view showing the sleeve of the gasket being axially compressed and radially deformed.

Cover 12 is attached to electrical box 14 with gasket 16 positioned therebetween. A plurality of threaded screws 112 having a head 114 and a threaded shaft 116 extend through screw holes 30 in base 22 and the axial passage 110 of sleeve 108 and into the threaded holes 20 of electrical box 14. Gasket 16 is assembled onto cover 12 as shown in FIG. 6 by inserting the sleeves 108 through a respective axial passage of the support member 68 and by inserting collar 68 through opening 42 in base 22. As shown in FIG. 9, screw head 114 has a substantially flat axial face 118 substantially perpendicular to the axis of threaded shaft 116. The top face of screw head 114 includes a slot 120 for engaging a screwdriver. Screw 112 passes through the axial passage of sleeve 108 until the axial bottom face 118 of screw head 114 contacts the flat axial face 122 of sleeve 108. Screws 112 are tightened to axially compress sleeve 108 into the respective support member 68 and to compress the axial end of sleeve 108 into the screw hole 30 and axial passage 110 of sleeve 108. The axial compression of sleeve 108 causes at least a portion of the sleeve 108 to expand radially into contact with the screw shaft 116 and the inner surface of support member 68 to form a watertight seal between screw 112 and support member 68. Typically the axial compression causes the sleeve 108 to buckle slightly so that a middle portion of the sleeve expands radially. Preferably, the top end of sleeve 108 is axially compressed into the screw hole 30 of base 22 without flaring the top end outwardly or contacting the surfaces of the recess 60. The axial face 118 of screw head 114 directly contacts the flat bottom surface 62 of recess 60 as shown in FIG. 10. The axial compression and radial expansion of sleeve 108 forms a watertight seal to prevent water and debris from entering the electrical box through the screw hole. In one embodiment screw head 114 has an inclined surface between the flat axial face 118 and shaft 116. Preferably the inclined surface does not cause any substantial flaring of the axial end of the sleeve so that the sleeve will compress axially.

While various embodiments have been illustrated and described, it will be understood by one skilled in the art that various changes and modifications can be made without departing from the spirit and scope of the invention as defined in the appended claims.

What is claimed is:

1. A cover for an electrical device, said cover comprising:
   a base having an opening with a dimension corresponding to the electrical device, a front surface and a rear surface, a screw hole extending between said front surface and said rear surface, and a support member extending from said rear surface; and
   a gasket having a body portion corresponding to a dimension of said base for forming a seal between said base and an electrical box, said gasket having a front surface, a rear surface, and a sleeve extending from said front face and positioned to align with said screw hole and support member of said base, said sleeve having a length to extending through said base, wherein said sleeve is axially compressible by a screw extending through said screw hole.

2. The cover of claim 1, wherein said support member has a cylindrical shape with an axial passage aligned with said screw hole, said axial passage having an inner dimension complementing an outer dimension of said sleeve.

3. The cover of claim 2, wherein said front surface of said base has a substantially flat surface surrounding said screw hole and where said screw hole has an axis extending substantially perpendicular to said flat surface.

4. The cover of claim 3, wherein said flat surface of said base surrounding said screw hole is recessed with respect to said front surface of said base.

5. The cover of claim 1, wherein said body portion of said gasket has a planar configuration, and a collar extending from said top surface and defining an axial passage through said gasket, said collar having an axial length sufficient to extend through said opening in said base.

6. The cover of claim 5, wherein said base includes a closure member hinged to said base for closing said opening and where said base includes a rib surrounding said opening in said base for mating with said closure member.

7. The cover of claim 1, wherein said base has a flange depending from a perimeter of said base and extending perpendicular to a plane of said base, and where said support member is a cylindrical shaped member having an axial length substantially equal to a length of said flange, whereby said flange and support member contact said body portion of said gasket.

8. A cover for an electrical device, said cover comprising:
a base having an opening with a dimension corresponding to a dimension of the electrical device, a front surface, and a rear surface, at least one screw hole extending between said front surface and said rear surface, and a support member extending from said rear surface and aligned with said screw hole, said support member having an axial passage;
a screw having a head and a threaded shaft extending through said screw hole and support member in said base for coupling said base to an electrical box; and
a gasket having a bottom portion corresponding to a dimension of said base for forming a seal between said base and an electrical box, said gasket having a front surface and a rear surface, a sleeve extending from said front surface and aligned with said screw hole and positioned within said support member of said base, said sleeve having an axial length extending through said screw hole a distance to contact said screw head, wherein tightening said screw with respect to said electrical box axially compresses said sleeve to form a seal against the screw head and to deflect the sleeve radially outwardly to form a seal between the screw shaft and the support member.

9. The cover of claim 8, wherein said base comprises a plurality of said screw holes, each screw hole having a support member aligned with a respective screw hole, and where said gasket has a plurality of said sleeves aligned with a respective screw hole, and where said sleeves have an axial length greater than an axial length of said support members.

10. The cover of claim 9, wherein said front surface of said base has a substantially flat surface surrounding said screw holes, and where said sleeves have an axial length to extend above said flat surface.

11. The cover of claim 10, wherein said flat surface of each screw hole is recessed with respect to said front surface of said base.

12. The cover of claim 8, wherein said gasket includes a collar extending from said top surface of said body portion and defining an axial passage for the electrical device, said collar having an axial length sufficient to extend through said opening in said base.

13. The cover of claim 8, wherein said base includes a closure member hinged thereto to cover said opening and where said base includes a rib surrounding said opening in said base for mating with said closure member.

14. The cover of claim 8, wherein said base has a flange depending from a perimeter thereof and extending perpendicular to a plane thereof, and where said support members have an axial length substantially equal to a length of said flange, whereby said flange and support member contact said body portion of said gasket.

15. The cover of claim 14, wherein said sleeve of said gasket has an axial length greater than an axial length of said support member and extends from said screw hole.

16. A method of forming a weatherproof seal between an electrical box and a cover, said method comprising:
positioning a cover and gasket onto an electrical box,
said cover including a base having an opening with a dimension corresponding to a dimension of an electrical device mounted to said electrical box, a front surface and a rear surface, at least one screw hole extending between said front and rear surface, and a support member having an axial passage and extending from said rear surface and aligned with said screw hole;
said gasket having a bottom portion corresponding to a dimension of said base and an electrical box, a front surface and a rear surface, and a sleeve extending from said front surface and extending through said axial passage of said sleeve and through said screw hole;
inserting a screw through said screw hole and sleeve, threading into said electrical box, and tightening said screw to axially compress said sleeve into said screw hole thereby radially expanding said sleeve to form a seal with said support member and said screw.

17. The method of claim 16, wherein said base has a flange extending from a perimeter of said base, said support member having an axial length substantially equal to an axial length of said flange, wherein said flange and support member contact said front surface body portion of said gasket.

18. The method of claim 17, wherein said sleeve has an axial length greater than an axial length of said support member.

19. The method of claim 17, wherein said front surface of said base has a substantially flat surface portion surrounding said screw hole and being perpendicular to an axis of said screw hole.

20. The method of claim 19, wherein said flat portion is recessed from said front surface.

21. The method of claim 19, wherein said screw has a screw head with a flat axial face, said method comprising tightening said screw whereby said flat axial face engages an axial end of said sleeve and axially compress said sleeve.

22. The method of claim 16, wherein said base includes a plurality of screw holes and support members and said gasket includes a plurality of sleeves aligned with a respective screw hole, said method comprising inserting a screw through each screw holes and sleeve and coupling to the electrical box to axially compress said sleeve.

23. The method of claim 22, wherein said support members have a cylindrical shape and an axial face for contacting said front surface of said gasket.

* * * * *